United States Patent [19]

Haberkern et al.

[11] Patent Number: 4,742,681
[45] Date of Patent: May 10, 1988

[54] MULTI-CYLINDER INTERNAL COMBUSTION ENGINE WITH FUEL INJECTION, IN PARTICULAR A TURBO-ENGINE

[75] Inventors: Eberhard Haberkern, Unterheinriet; Gerhard Lotterbach, Markgroningen; Jan F. van Woudenberg, Schwiegerdingen; Udo Zucker, Guglingen, all of Fed. Rep. of Germany

[73] Assignee: Robert Bosch GmbH, Stuttgart, Fed. Rep. of Germany

[21] Appl. No.: 947,248

[22] Filed: Dec. 29, 1986

[30] Foreign Application Priority Data

Jan. 22, 1986 [DE] Fed. Rep. of Germany ....... 3601700

[51] Int. Cl.4 .............................................. F02B 33/44
[52] U.S. Cl. ................................. 60/606; 123/198 DC
[58] Field of Search ............................... 60/605, 606; 123/198 DC, 198 DB

[56] References Cited

U.S. PATENT DOCUMENTS 4,470,390  9/1984  Omori et al. ................. 60/605 X
4,593,525  6/1986  Mezger ........................... 60/606

Primary Examiner—Stephen F. Husar
Attorney, Agent, or Firm—Edwin E. Greigg

[57] ABSTRACT

In a multi-cylinder internal combustion engine having fuel injection, in particular a turbo-engine, having air intake and exhaust gas conduits, a turbocharger and a regulating valve for furnishing combustion air to the exhaust gas conduit when the throttle valve in the air intake conduit is closed partially or entirely, in order to maintain the charge pressure of the turbocharger during overrunning or at partial load with good efficiency of the system. When the regulating valve opens, a portion of the cylinders is not ignited and the remaining portion of the cylinders is ignited at an extremely late instant of ignition, with suitable metering of the fuel injection quantity. A total fuel quantity is injected into the non-ignited cylinders that together with the combustion air supplied to the exhaust gas conduit burns to produce an additional exhaust gas volume that keeps the turbine of the turbocharger disposed in the exhaust gas conduit at a sufficiently high rpm for furnishing a sufficiently high air throughput via the compressor.

11 Claims, 2 Drawing Sheets

MULTI-CYLINDER INTERNAL COMBUSTION ENGINE WITH FUEL INJECTION, IN PARTICULAR A TURBO-ENGINE

BACKGROUND OF THE INVENTION

The invention is directed to improvements in turbocharged multi-cylinder internal combustion engines provided with fuel injection.

In engines of this kind, equipped with a turbocharger, the energy of the exhaust gas is utilized to drive the turbine, which in turn drives the compressor connected to it; as a result, the charge pressure of the combustion air supplied to the cylinders is increased, and the engine accordingly produces higher torque.

However, at low cylinder throughput such as is the case during overrunning of the engine used as a motor vehicle engine, or at low partial load, the air flow rate generated by the turbocharger is low. To increase the air flow rate in a known turbo-engine, an additional volume of exhaust gas is generated during overrunning and at partial load—that is, when the throttle valve is not fully opened—bypassing the cylinders in the exhaust gas conduit. This additional volume acts upon the turbine of the turbocharger and causes it to rotate faster than it does with only the quantities of exhaust gas that emerge from the cylinders. As a result, the turbocharger is kept to speed during overrunning and at partial load, and an adequate air flow rate is attained. The so-called "turbo lag" that normally arises in turbo-engines is avoided, and the overall response of the turbocharger is improved.

To generate the additional exhaust gas volume, combustion air that is under pressure in the intake conduit is supplied through the regulating valve, bypassing the cylinders, to the exhaust gas conduit when the throttle valve is closed or partly opened. The required fuel quantity is delivered through the cylinders, in which ignition is suppressed, to the exhaust gas conduit. The mixture of combustion air and unburned fuel ignites in the exhaust gas conduit, resulting in the additional exhaust gas volume that drives the turbine. Since only small quantities of fuel are needed here, the fuel injection into the cylinders does not have to occur upon every revolution of the crankshaft; instead, it can be performed only every m revolutions, m being an integer greater than or equal to 1.

OBJECT AND SUMMARY OF THE INVENTION

The internal combustion engine according to the invention has the advantage that the engine is not adversely affected by shutting off the cylinder ignition completely; instead, only one cylinder shutoff takes place, to reduce the mechanical work. Thus the transition to overrunning is made smoother, and the operation of the engine during overrunning is improved. The extremely late angle or instant of ignition has a deleterious effect on the efficiency of the cylinders operating at that instant, such that virtually no mechanical work is done and all the combustion energy is devoted to raising the temperature of the exhaust gases considerably. The hot exhaust gases burn the fuel-air mixture, supplied to the exhaust conduit via the non-igniting cylinders and the regulating valve, without residue and so the efficiency of the system in terms of the additional generation of exhaust gas is improved. The fuel quantity required to supply the demand for additional exhaust gas is injected in an arbitrary distribution into the individual non-igniting cylinders and reaches the exhaust gas conduit unburned. The regulating valve is opened as soon as a predetermined value derived from operating characteristics, such as pressure or air throughput in the intake conduit or engine speed, fails to be attained i.e., as soon as the selected parameter drops below a predetermined value; and subjects the exhaust gas conduit to intake air that is under such pressure as prevails in the intake conduit upstream of the throttle valve. The predetermined value is set such that the described state occurs in engine overrunning (throttle valve closed) and/or at low partial-load operation (throttle valve opened extremely slightly). The predetermined value can also be formed by a logical linkage of these operating characteristics.

By means of the provisions disclosed advantageous features of and improvements to the particular engine described are possible.

An advantageous embodiment of this invention will be revealed later herein. In this embodiment, the portion of the cylinders in operation, that is, those that are igniting, revolves through the total number of cylinders present. At least one previously ignited cylinder is not ignited in the next ignition routine that occurs, and one previously non-ignited cylinder is ignited in that routine. This prevents the combustion chamber temperatures in the various cylinders from being dissimilar.

In this aspect of this invention, the arrangement is made wherein individual intake fittings leading would make resumption of ignition of the fuel mixture problematic. This also assures that fuel will not get into the oil.

A further advantageous embodiment of the invention is also recited wherein a regulating valve is disposed in a bypass thus bypassing the throttle valve. By disposing the regulating valve solely on the fresh-air side, upstream of the engine cylinders, the construction cost for the regulating valve is substantially lower, because it need not be designed for the higher load demands that prevail if it is subjected on the outlet side with the hot exhaust gases in the exhaust conduit as in another exemplary embodiment disclosed herein. Furthermore, the ignited cylinders are filled with air to a substantially greater extent than is otherwise possible during overrunning; once again, this promotes the desired efficiency.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
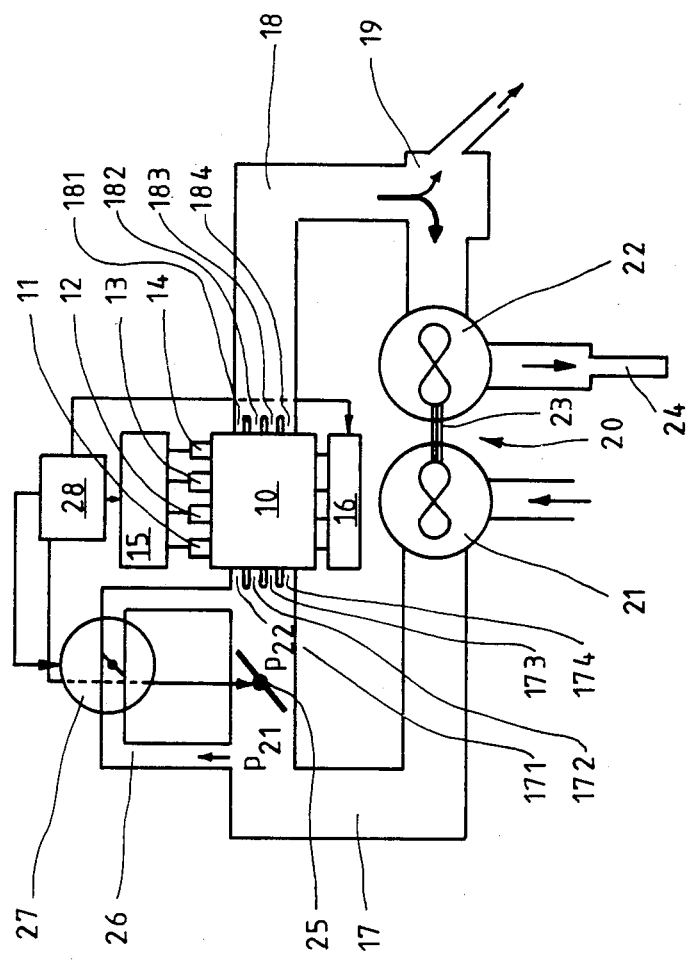
FIGS. 1 and 2 each show a turbo-engine in schematic form.

The turbo-engine, which is only schematically shown in FIG. 1, as an example of a multi-cylinder internal combustion engine with fuel injection, has an engine block 10 with four cylinders, which are illustrated on the engine block and marked 11-14. The cylinders 11-14 are connected to an ignition system 15, which ignites the cylinders 11-14 in succession, in accordance with the position of the crankshaft, during each crankshaft revolution. A fuel injection apparatus 16 furnishes the individual cylinders 11-14 with a metered quantity of fuel, which is injected into the cylinders 11-14 via injection valves, not shown. An air intake conduit 17 leads to the engine block 10 and discharges into intake fittings 171-174 leading to the individual cylinders 11-14. Leading away from the cylinders are exhaust gas fittings 181-184, which are combined into one exhaust gas conduit or manifold 18. A turbocharger 20, in a known manner, comprises a compressor 21 and a turbine 22 rigidly joined to the compressor 21 via a coupling shaft 23. In the usual manner, the compressor 21 is disposed in the intake conduit 17 and the turbine 22 is disposed in the exhaust gas conduit 18. The turbine 22 is preceded in the exhaust gas conduit 18 by a charge pressure regulating valve 19, with which the quantity of exhaust gas delivered to the turbine 22 in full-load operation can be regulated. The section of the exhaust gas conduit 18 leading away from the turbine 22 discharges into a tail pipe 24.

In the intake conduit 17, upstream of the intake fittings 171-174, there is a controllable throttle valve 25, which reduces the intake pressure $p_{21}$ prevailing in the intake conduit 17 to a suction pipe pressure $p_{22}$. Depending on the engine load, the throttle valve 25 opens up a larger or smaller cross section of the intake conduit 17 for the flow through of aspirated air, so that the suction pipe pressure $p_{22}$ assumes various values accordingly. The throttle valve 25 is bypassed by a bypass 26, in which the intake to the bypass is at one end in the section of the intake conduit 17 upstream of the throttle valve 25 and on the other end discharges into the section of the intake conduit 17 downstream of the throttle valve 25 and upstream of the individual intake fittings 171-174. A pneumatically or electrically controlled regulating valve 27 is disposed in the bypass 26. The regulating valve 27 is embodied such that it is normally closed, and opens whenever the pressure $p_{22}$, which prevails in the intake conduit 17 downstream of the throttle valve 5, that is, in the section of the intake conduit 17 between the throttle valve 25 and the intake fittings 171-174, is smaller than a predetermined value. The predetermined value is set such that in overrunning and at low partial load, that is, when the throttle valve 25 is closed completely or nearly completely, the pressure $p_{22}$ falls below the predetermined value. A control unit 28 connected to the regulating valve 27, the control valve 25, the ignition system 15 and the fuel injection apparatus 16 varies the ignition of the individual cylinders 11-14 and the fuel injection in the manner that will now be described:

If the throttle valve 25 is closed completely, or virtually completely (i.e., during overrunning or in low partial-load operation), and the pressure $p_{22}$ immediately upstream of the intake fittings 171-174 is lower than the predetermined value, then the regulating valve 27 opens. Aspirated air at the pressure $p_{21}$ thus reaches the cylinders 11-14 via the intake fittings 171-174. By means of the control unit 28, one portion of the cylinders 11-14—for instance, cylinders 11-13—is non ignited during each ignition routine, and the remaining portion—for instance, the cylinder 14—is ignited extremely late. A certain fuel quantity is injected into the ignited cylinder 14 by the fuel injection apparatus 16. This quantity burns together with the aspirated air in the cylinder 14 with such poor efficiency, because of the late instant of ignition, that little mechanical work is done and extremely not exhaust gases are produced. In the remaining portion of the non-ignited cylinders 11-14, in this case in cylinders 11-13, an overall predetermined fuel quantity is injected; the rates of injection may be different for the various cylinders 11-13. The unburned air and unburned fuel in the cylinders 11-13 reach the exhaust gas conduit 18, where they are ignited by the hot exhaust gases from the working cylinder 14. The result is an additional volume of exhaust gas, which acts upon the turbine 22 and keeps it at a sufficiently high rpm for an adequate charge pressure even during engine overrunning. The additional volume of exhaust gas can be metered very accurately by metering the quantity of fuel injected into the non-ignited cylinders, in this case cylinders 11-13.

In order to avoid non-uniform combustion chamber cylinders and to prevent drying out of the intake fittings 171-174, the portion of ignited and non-ignited cylinders, from among the total of the cylinders 11-14, is changed every nth ignition routine; n may be an arbitrary integer, for example, 1. This means that during one ignition routine, that is, during one revolution of the crankshaft, the cylinder 14 is ignited and cylinders 11-13 are not ignited, while in the next ignition routine the cylinder 11 is ignited and cylinders 12-14 are not ignited, and so forth. The operating working cylinder is accordingly rotated, as it were, not around an axis but rotated among the cylinders. Naturally, it is also possible for two cylinders to be ignited and two cylinders not to be ignited during each ignition routine instead.

Figure 2:
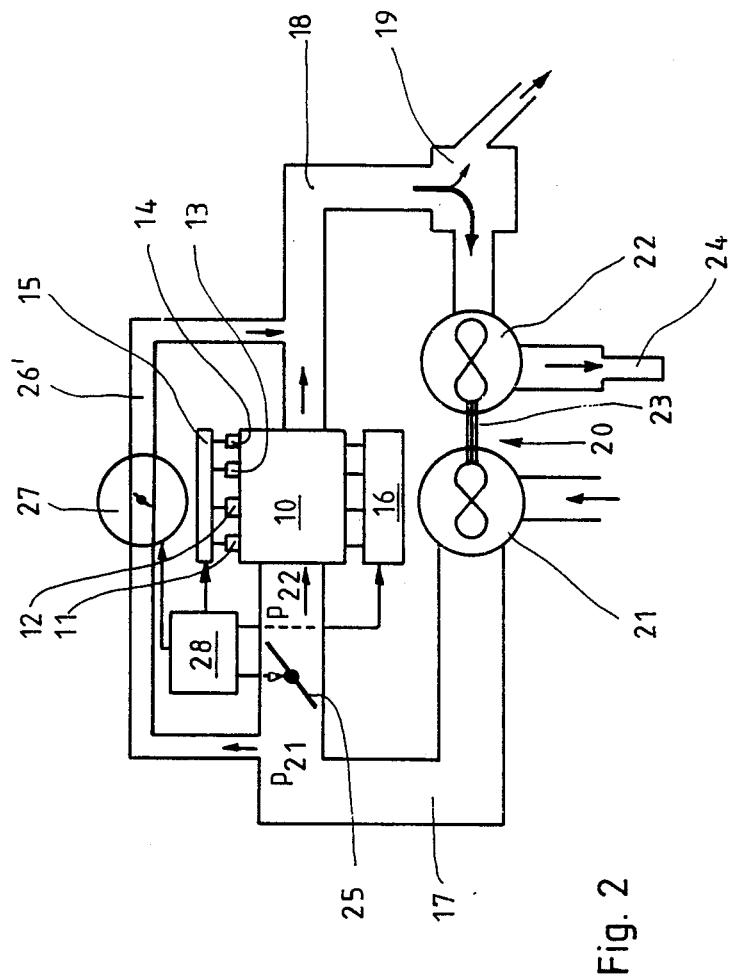

The turbo-engine shown schematically in FIG. 2 differs only slightly from that sketched in FIG. 1 and described above, and so identical components are identified by the same reference numerals. The only difference is that the bypass 26' does not only bypass the throttle valve 25; instead it bypass, the series connection of the throttle valve 25 and engine block 10, that is, it discharges into the exhaust gas conduit 18, specifically into the section of the exhaust gas conduit 18 downstream of the engine block 10 and upstream of the charge pressure regulating valve 19. By means of this arrangement, with the opened regulating valve 27 the aspired air having the pressure $p_{21}$ is carried directly to the exhaust gas conduit 18, bypassing the engine block. The associated quantity of gasoline is thus carried through the non-ignited cylinders into the exhaust gas conduit 18. As in FIG. 1, an additional exhaust gas volume for driving the turbine is generated in the exhaust gas conduit 18, which now acts as an afterburner, by combustion of the fuel-air mixture forming there. The ignition of the individual cylinders 11-14 and the fuel injection into the various cylinders 11-14 are effected in the same manner as described in conjunction with FIG. 1.

The invention is not restricted to the exemplary embodiments described above. The regulating valve, for example, need not be opened only as a function of the pressure in the intake conduit, but may also be opened as a function of other operating characteristics, such as air throughput in the intake conduit or rpm of either the turbo-engine or turbocharger. It is also possible for the predetermined value at which the regulating valve opens to be obtained by means of a logical linkage of all or some of these operating characteristics, that is, pressure and air throughput in the intake conduit and rpm of the turbo-engine or turbocharger.

In the same manner, the invention can be applied to an internal combustion engine or turbo-engine having one or more turbochargers, in which each turbocharger supplies a group of several cylinders.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A multi-cylinder internal combustion engine having fuel injection into cylinders of the engine which comprises, an air intake conduit, a throttle valve in said air intake conduit leading to the cylinders, an exhaust gas conduit leading away from the cylinders, a turbocharger having a compressor disposed in the intake conduit and a turbine driving the compressor disposed in the exhaust gas conduit, a regulating valve having an inlet side and an outlet side in a bypass line that communicates with the intake conduit section between the compressor and the throttle valve, a control means, said control means controlling said regulating valve to open below a predetermined value derived from engine operating characteristics such as at least one of pressure, air throughput in the intake conduit, engine rpm, and turbocharger rpm, said regulating valve having an output furnishing combustion air for providing an additional exhaust gas volume to the exhaust gas conduit to serve as an afterburner, characterized in that upon opening of the regulating valve, said control means functions to ignite only a portion of the cylinders at an extremely late instant of ignition with suitable metering of a fuel injection quantity, and a total fuel quantity determining an additional exhaust gas volume is injected into non-ignited cylinders to pass into the exhaust gas volume unburned.

2. An internal combustion engine as defined by claim 1, in which during every nth ignition routine, the portion of the ignited cylinders and the portion of nonignited cylinders is interchanged in composition from among all the cylinders, n being an arbitrary integer.

3. An internal combustion engine as defined by claim 1, in which the regulating valve is disposed in said bypass line and arranged to bypass the throttle valve.

4. An internal combustion engine as defined by claim 2, in which the regulating valve is disposed in said bypass line and arranged to bypass the throttle valve.

5. An internal combustion engine as defined by claim 1, in which said regulating valve (27) communicates on its outlet side with a section of the exhaust gas conduit (18) downstream of the cylinders.

6. An internal combustion engine as defined by claim 2, in which said regulating valve (27) communicates on its outlet side with a section of the exhaust gas conduit (18) downstream of the cylinders.

7. An internal combustion engine as defined by claim 3, in which said regulating valve (27) communicates on its outlet side with a section of the exhaust gas conduit (18) downstream of the cylinders.

8. An internal combustion engine as defined by claim 1, in which said regulating valve (27) communicates on its outlet side with a section of said air intake conduit 17 upstream of said cylinders and downstream of said throttle valve 25.

9. An internal combustion engine as defined by claim 2, in which said regulating valve (27) communicates on its outlet side with a section of said air intake conduit 17 upstream of said cylinders and downstream of said throttle valve 25.

10. An internal combustion engine as defined by claim 3, in which said regulating valve (27) communicates on its outlet side with a section of said air intake conduit 17 upstream of said cylinders and downstream of said throttle valve 25.

11. A method of operating an internal combustion engine provided with fuel injection means and multiple cylinder means, and having a turbocharger including a compressor, the steps of:

providing an air intake conduit to said engine with a throttle valve;

providing an exhaust conduit which extends away from said internal combustion engine;

positioning the turbocharger so that the compressor thereof is disposed in said intake conduit and the turbine thereof is mounted in said exhaust conduit;

associating a regulating valve having means connected to said air intake conduit in proximity to said throttle valve which bypasses said throttle valve, controlling said regulating valve to open below a predetermined pressure value derived from engine operating characteristics such as at least one of pressure, air throughput in the intake manifold, engine rpm and turbocharger rpm to thereby furnish combustion air to the exhaust conduit for generating an additional exhaust gas volume serving as an afterburner, operating a control means to ignite at least one of said cylinder means while not igniting a portion of said multiple cylinder means, feeding a metered quantity of fuel to said portion of said cylinders which are not ignited and feeding a further metered quantity of fuel to at least one said cylinder means which is ignited and at an extremely late instant of ignition, and injecting air from said regulating valve and unburnt fuel from said cylinder means into the exhaust gas volume to provide an additional exhaust gas supply for said turbocharger, whereby said turbocharger can be maintained at an operational rpm and turbo lag avoided.

* * * * *